United States Patent
Fujishima (10) Patent No.: US 8,599,327 B2
(45) Date of Patent: Dec. 3, 2013

(54) LIQUID CRYSTAL DISPLAY APPARATUS AND METHOD FOR DUST PREVENTION OF LIQUID CRYSTAL DISPLAY APPARATUS

(75) Inventor: Tomokazu Fujishima, Kanagawa (JP)

(73) Assignee: NLT Technologies, Ltd., Kawasaki, Kanagawa (JP)

( * ) Notice: Subject to any disclaimer, the term of this patent is extended or adjusted under 35 U.S.C. 154(b) by 233 days.

(21) Appl. No.: 11/640,899

(22) Filed: Dec. 19, 2006

(65) Prior Publication Data

US 2007/0146612 A1 Jun. 28, 2007

(30) Foreign Application Priority Data

Dec. 26, 2005 (JP) .................................. 2005-373195

(51) Int. Cl.
*G02F 1/1333* (2006.01)
*G02F 1/1345* (2006.01)

(52) U.S. Cl.
USPC ............................................ 349/58; 349/150

(58) Field of Classification Search
USPC ........ 349/58–71, 150; 362/600–634; 361/681
See application file for complete search history.

(56) References Cited

U.S. PATENT DOCUMENTS

| | | | |
|---|---|---|---|
| 5,400,160 A * | 3/1995 | Takahashi et al. | 349/60 |
| 5,889,623 A | 3/1999 | Ueda et al. | |
| 5,959,709 A * | 9/1999 | Asada et al. | 349/150 |
| 6,862,053 B2 * | 3/2005 | Lee et al. | 349/58 |
| 7,432,998 B2 * | 10/2008 | Nishio et al. | 349/58 |
| 7,453,532 B2 * | 11/2008 | Kondo et al. | 349/58 |
| 2004/0181938 A1 * | 9/2004 | Suzuki et al. | 29/832 |
| 2005/0094052 A1 * | 5/2005 | Sakurai et al. | 349/58 |

FOREIGN PATENT DOCUMENTS

| | | | |
|---|---|---|---|
| JP | 05107529 A | * | 4/1993 |
| JP | 2001-330817 | | 11/2001 |
| JP | 2002031813 A | * | 1/2002 |
| JP | 2002-108238 | | 4/2002 |
| TW | 390969 | | 5/2000 |

OTHER PUBLICATIONS

Taiwanese Office Action dated Apr. 14, 2011 (with a partial English translation).

* cited by examiner

*Primary Examiner* — Jessica M Merlin
(74) *Attorney, Agent, or Firm* — McGinn Intellectual Property Law Group, PLLC (57) ABSTRACT

Disclosed is a liquid crystal display apparatus including a liquid crystal panel, and a backlight unit which is disposed on a back side of the liquid crystal panel, wherein the liquid crystal display apparatus further includes a dust preventing tape which is stuck to a region including at least a peripheral portion of a display surface of the liquid crystal panel and a side surface of the backlight unit in order to cover the region. A dust preventing method for a liquid crystal display apparatus is also disclosed.

21 Claims, 5 Drawing Sheets

FIG.6

LIQUID CRYSTAL DISPLAY APPARATUS AND METHOD FOR DUST PREVENTION OF LIQUID CRYSTAL DISPLAY APPARATUS

BACKGROUND OF THE INVENTION

1. Field of the Invention

The present invention relates to a liquid crystal display apparatus and a method for dust prevention of the liquid crystal display apparatus.

2. Description of the Related Art

A liquid crystal display apparatus is widely used as a monitor and the like of office automation equipment and a television because of its superior characteristics of compactness, thinness, light weight and low electric power consumption. The liquid crystal display apparatus includes a liquid crystal panel formed by interposing liquid crystal between two of transparent substrates facing each other, a backlight unit which generates backlight that illuminates the liquid crystal panel, and the like. The liquid crystal display apparatus of a thin type usually uses the backlight unit of an edge light type.

The backlight unit of this type includes a frame-shaped chassis, a frame-shaped shield plate, a light guide plate, a light source, an optical member, a reflecting member and the like. The chassis and the shield plate hold and fix each of constituent members in them. The light guide plate is disposed inside the chassis and guides the light emitted by the light source. The light source is disposed at the edge face of the light guide plate. The optical member is disposed on the front surface (i.e., at the side of the liquid crystal panel) of the light guide plate, diffuses and uniforms the light coming from the light guide plate, irradiating the light on the liquid crystal panel. The reflecting member is disposed on the back face (i.e., opposite side to the liquid crystal panel) of the light guide plate, and reflects the light going from the back face of the light guide plate toward the light guide plate.

Figure 1:
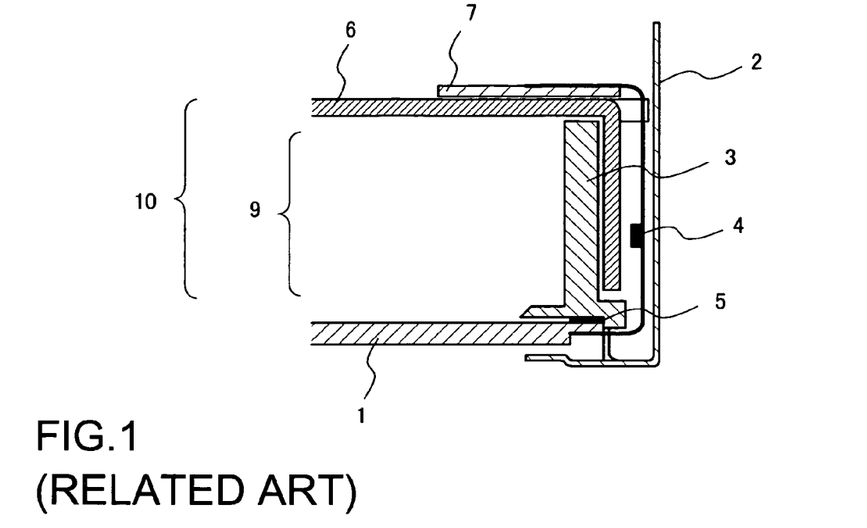
FIG. 1 is a cross-sectional view showing the structure of the main constituent members of one example of the conventional liquid crystal display apparatus.
Figure 2:
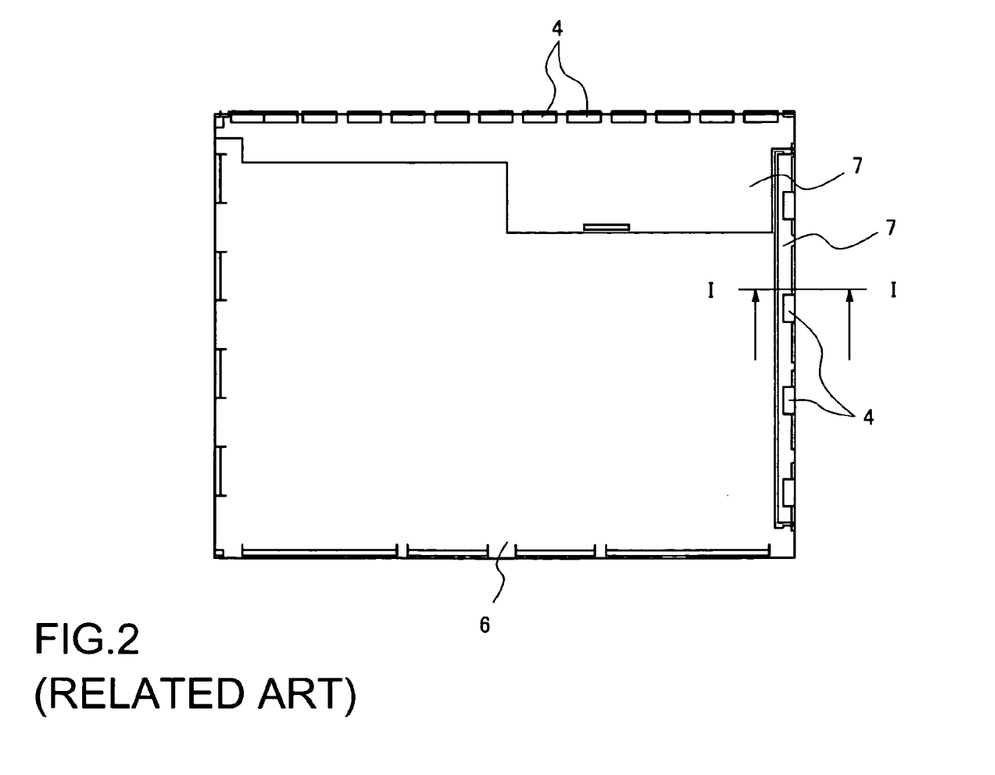
FIG. 2 is a rear view showing one example of the conventional liquid crystal display apparatus.
Figure 3A:
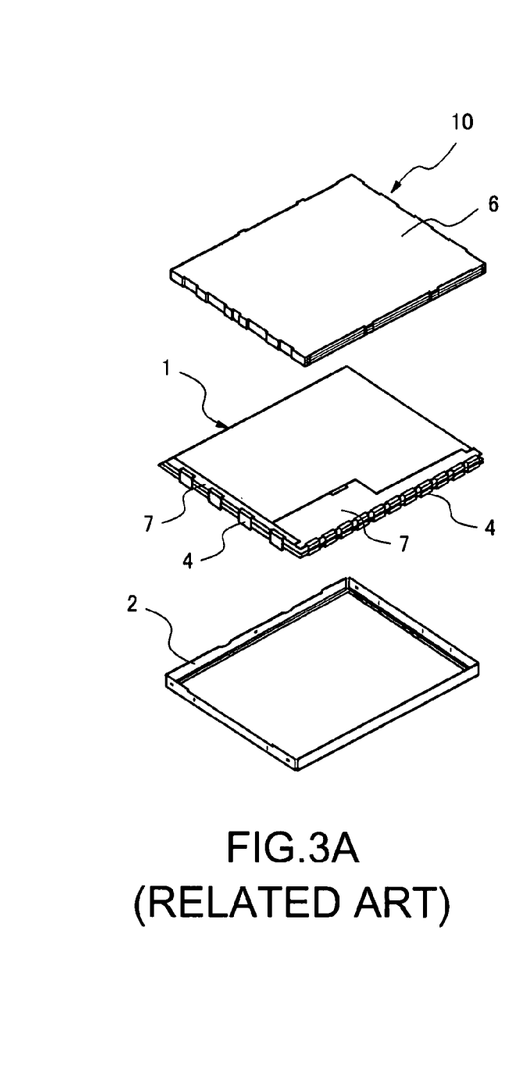
FIG. 3A, FIG. 3B and FIG. 3C are perspective views schematically showing the assembling procedures of one example of the conventional liquid crystal display apparatus.
Figures 3B, 3C:
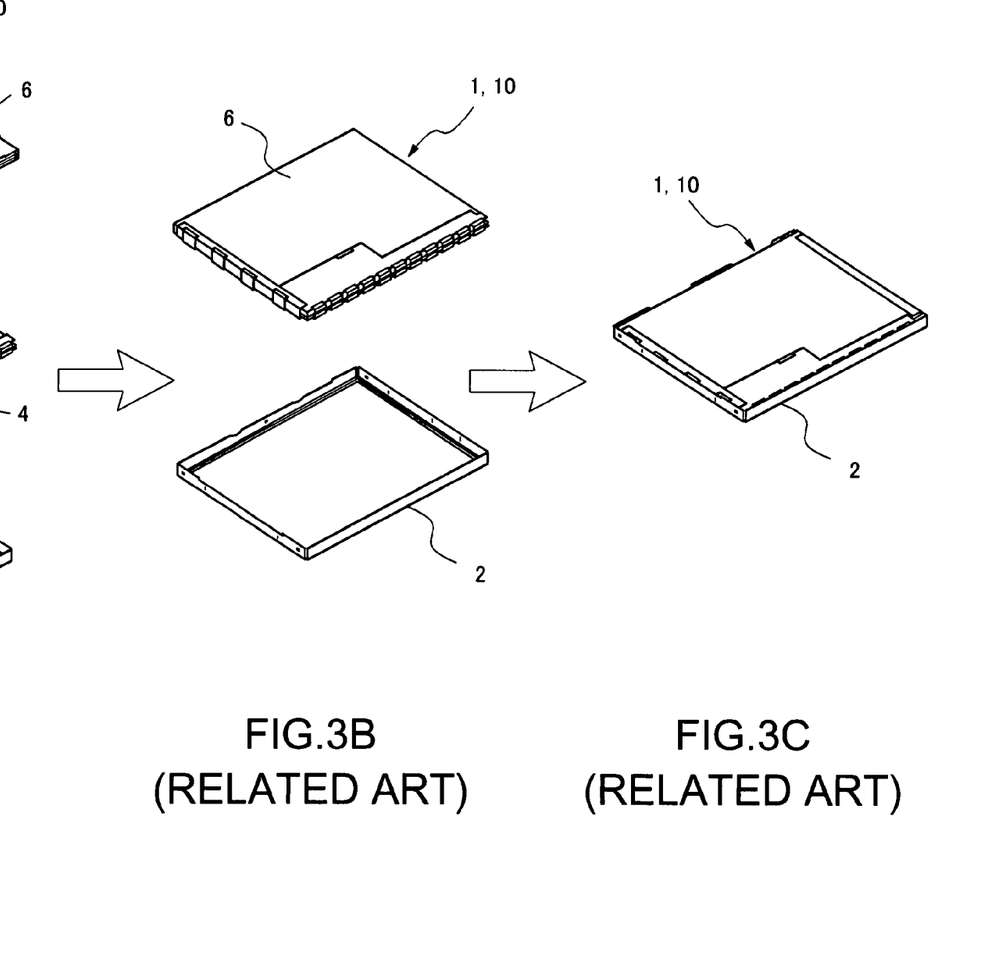

One example of the conventional liquid crystal display apparatus is described with reference to FIG. 1 to FIG. 3C. FIG. 1 is a cross-sectional view showing the structure of the main constituent members of one example of the conventional liquid crystal display apparatus. FIG. 2 is a rear view (plan view viewed from the rear side) of the example of the conventional liquid crystal display apparatus. Here, the cross-sectional views taken along the line I-I in FIG. 2 from the arrow direction is FIG. 1. FIGS. 3A, 3B and 3C are perspective views schematically showing the assembling procedure of the example of the conventional liquid crystal display apparatus.

As shown in FIG. 1 and FIG. 3A to FIG. 3C, the conventional liquid crystal display apparatus mainly consists of a backlight unit 10 and a liquid crystal panel 1. The conventional liquid crystal display apparatus further has a frame-shaped front side shield plate 2. As shown in FIG. 1, the front side shield plate 2 has a sectional shape which covers the peripheral portion (outside perimeter) of the display surface of the liquid crystal panel 1, and the side surface of the backlight 10. As the assembling procedure of such a liquid crystal display apparatus, starting from the state shown in FIG. 3A, the backlight unit 10 is assembled to the back surface of the liquid crystal panel 1 to be in the state shown in FIG. 3B. Then, the front side shield plate 2 is assembled to this to complete the liquid crystal display apparatus (FIG. 3C).

As shown in FIG. 1, the backlight unit 10 is provided with a frame-shaped chassis 3, a light guide plate (not shown) held by the chassis 3 and a back side shield plate 6 which covers the side surface of the chassis 3 and the back surface of the light guide plate. The light guide plate is not shown in FIG. 1, and is disposed in a space shown by the reference numeral 9. In the case of an edge light type backlight unit, the light source is disposed at one edge surface of the light guide plate, and the light from the light source is guided to the back surface of the liquid crystal panel 1 by the light guide plate. In the case of a direct light type backlight unit, the light source is disposed directly under the light guide plate. In the chassis 3, a spacer 5 is interposed on the face on which the liquid crystal panel 1 is mounted. A circuit board 7 for driving the liquid crystal panel 1 is mounted to the outer surface of the back side shield plate 6, or the side surface of the chassis 3. The circuit board 7 and the liquid crystal panel 1 are connected with a TCP (Tape Carrier Package) 4 that is a connecting member constituted of a flexible tape. The TCP 4 is an LSI driver that operates the liquid crystal panel 1, and may be a COF (Chip On Film). The circuit board 7 connected with the TCP 4 supplies a signal which drives a semiconductor element such as a TFT integrated on the liquid crystal panel 1.

The dust prevention measures in the conventional liquid crystal display apparatus as described above mainly include the following methods.

(1) Method for preventing entry of dust into the liquid crystal display apparatus by bringing the liquid crystal panel 1 into close adhesion to the backlight unit 10.

However, in this method, in order to enhance close adhesion between the liquid crystal panel 1 and the chassis 3, it is necessary to use a member having a certain degree of stickiness such as silicon, as the spacer 5. In this case, a stress difference occurs due to unevenness in close adhesion to the liquid crystal panel 1 by the influence of heat or the like occurring inside the liquid crystal display apparatus, and the stress difference is likely to cause uneven display.

(2) Method for reducing the clearance until the front side shield plate 2 and the liquid crystal panel 1 are brought into contact with each other. Alternatively, the preventing method for slipping of dust by adding a barrier at the side of the liquid crystal panel surface, of the opening of the front side shield plate 2, and bringing the barrier into contact with the liquid crystal panel 1 to suppress the gap.

However, in this method, there is also the possibility of occurrence of the problem of uneven display. This is because the spot of contact between the surface of the liquid crystal panel 1 and the constituent member such as the front side shield plate 2 contact or closely adhesion to each other is in the state in which stress such as pressure is applied to the surface of the liquid crystal panel 1, and the optical characteristics of the liquid crystal panel 1 partially differ.

Figure 4A:
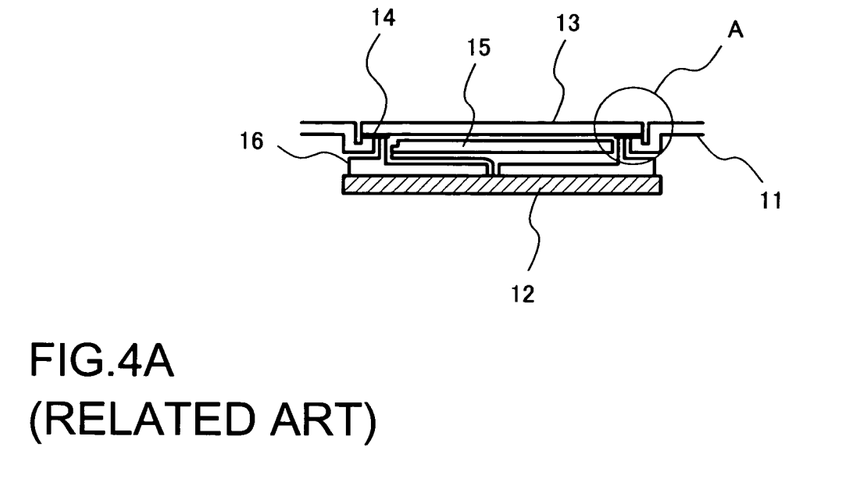
FIG. 4A and FIG. 4B are cross-sectional views showing another example of the conventional liquid crystal display apparatus and a partially enlarged cross-sectional view of FIG. 4A, respectively.
Figure 4B:
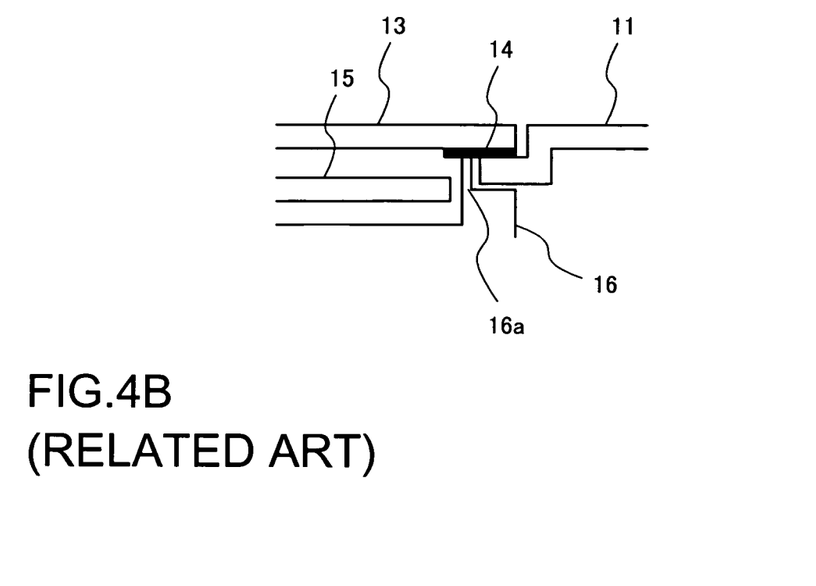

Further, another example of the conventional liquid crystal display apparatus is described by using other drawings. Japanese Patent Laid-Open Publication JP 2002-108238A discloses the information terminal equipment including a liquid crystal display. FIG. 4A is a sectional view showing another example of the conventional liquid crystal display disclosed in this JP 2002-108238A. FIG. 4B is an enlarged cross-sectional view of a circular portion A in FIG. 4A.

The information terminal equipment is capable of realizing dust prevention without using a dust preventing cushion, reducing cost and simplifying the assembling process.

As shown in FIG. 4A and FIG. 4B, in the information terminal equipment, the case 11 includes an opening for setting a screen 13, and the screen 13 is disposed in the opening to form the display part. The back surface of the screen 13 is bonded to the case 11 by a double-face coated adhesive tape 14 in the opening. Further, the double-face coated adhesive tape 14 bonds a frame rib 16a of a fixing member (LCD frame) 16 which contains a liquid crystal display 15 to the screen 13. In order to bond the screen to the frame rib 16a, the double-face coated adhesive tape 14 is provided on the area wider inside than the screen sticking surface.

In the above conventional example, the information terminal equipment body is formed by the case 11 including the display part and the cover not shown. In the information terminal equipment body, the liquid crystal display 15 is mounted to the circuit board 12 via the LCD frame 16. The screen 13 is stuck to the outer periphery of the opening for the liquid crystal display part of the case 11 by the double-face coated adhesive tape 14.

The LCD frame 16 has a space for containing the liquid crystal display 15, and includes the frame rib 16a which is fitted inside the opening for the liquid crystal display part of the case 11. The frame rib 16a is formed to have the same height as the screen sticking surface of the case 11 at the time of assembly. The frame rib 16a reaches the back surface of the screen 13 to be stuck, and thereby makes it possible to bond the screen 13 to the double-face coated adhesive tape 14 which bonds the screen 13 to the opening for the liquid crystal display part. Thus, the frame rib 16a fills the role of keeping hermetical sealing with the screen 13.

Accordingly, the LCD frame 16 containing the liquid crystal display 15 closely adheres to the screen 13, whereby, the periphery of the liquid crystal display 15 is sealed, and slipping path of dust or the like can be prevented without adding a dust-proof cushion or the like.

However, in this conventional example, the screen 13 is provided at the front surface of the liquid crystal display 15, and therefore, there arises the problem of unfavorable visibility of the liquid crystal display 15.

As still another conventional example, a liquid crystal display apparatus using a metal casing for prevention of occurrence of dust such as resin dust is disclosed in Japanese Patent Laid-Open Publication JP 2001-330817A. In this example, the liquid crystal panel is disposed in the metal casing, and the liquid crystal panel and the metal casing are bonded to each other by using a double-face coated adhesive tape.

In this conventional example, the spot of contact between the liquid crystal panel and the constituent member and closely adhesion to each other is in the state in which a stress such as pressure is applied to the liquid crystal panel, and the optical characteristics of the liquid crystal panel partially differ. Therefore, there is the problem of occurrence of uneven display.

SUMMARY OF THE INVENTION

The present invention is made in view of the above problems.

An object of the present invention is to provide a liquid crystal display apparatus which prevents uneven display and realizes dust prevention measures, and a dust preventing method for the liquid crystal display apparatus.

The present invention provides a liquid crystal display apparatus including a liquid crystal panel, and a backlight unit which is disposed on a back side of the liquid crystal panel, wherein the liquid crystal display apparatus further includes a dust preventing tape which is stuck to a region including at least a peripheral portion of a display surface of the liquid crystal panel and a side surface of the backlight unit in order to cover the region.

Further, the present invention provides a dust preventing method for a liquid crystal display apparatus including a liquid crystal panel, and a backlight unit which is disposed on a back side of the liquid crystal panel, wherein a dust preventing tape is stuck to a region including at least a peripheral portion of a display surface of the liquid crystal panel and a side surface of the backlight unit in order to cover the region.

As described above, according to the present invention, the liquid crystal display apparatus which realizes both the dust prevention measures and prevention of uneven display at the same time, and the dust preventing method for the liquid crystal display apparatus are provided.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

Figure 5:
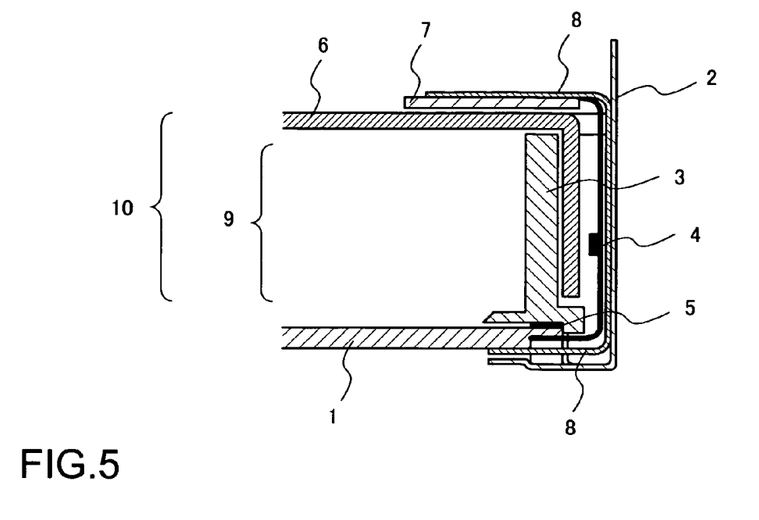
FIG. 5 is a cross-sectional view showing the structure of the main constituent member in an exemplary embodiment of the present invention.
Figure 6:
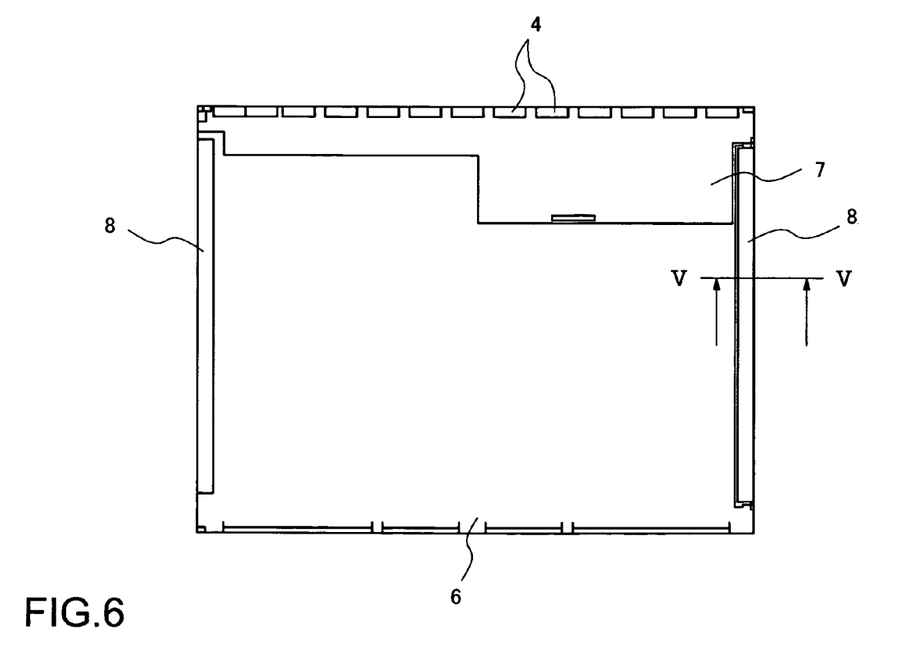
FIG. 6 is a rear view showing the exemplary embodiment of the present invention.
Figure 7A:
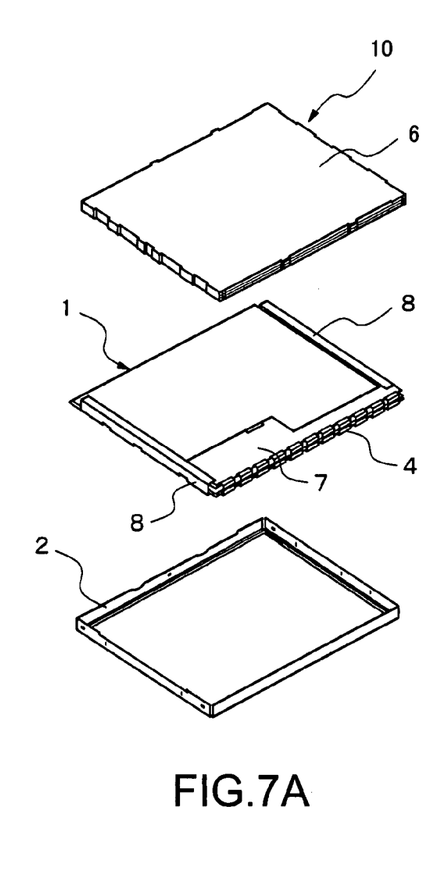
FIG. 7A, FIG. 7B and FIG. 7C are perspective views schematically showing the assembling procedure of the exemplary embodiment of the present invention.
Figure 7B:
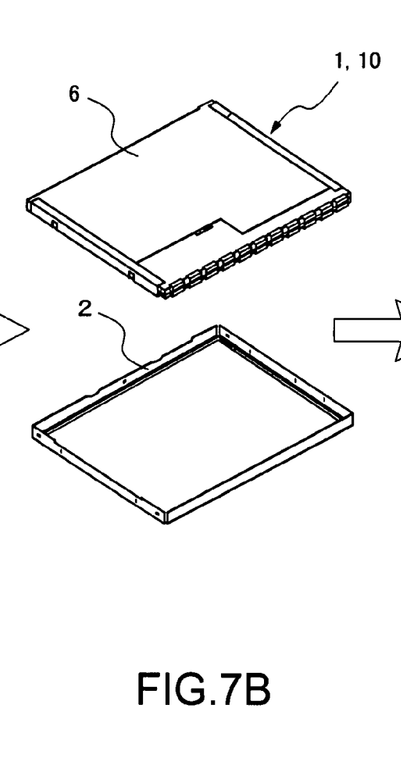
Figure 7C:
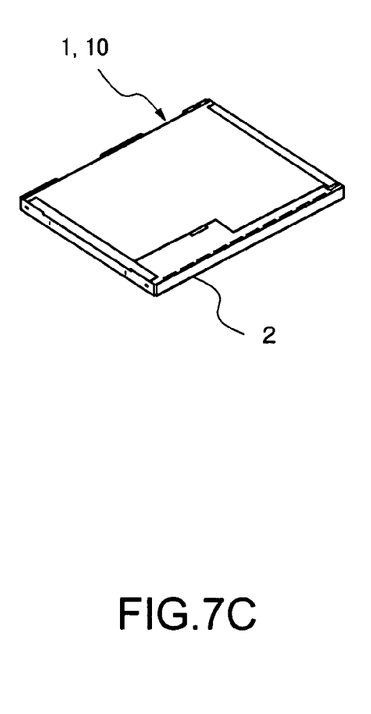

FIG. 5 is a cross-sectional view showing the structure of the main constituent members in an exemplary embodiment of the present invention. FIG. 6 is a rear view showing the exemplary embodiment of the present invention, and shows the structure viewed from the back surface (opposite side to the liquid crystal panel). Here, the state of the cross-section along the V-V line in FIG. 6 viewed from the arrow direction is FIG. 5. FIG. 7A, FIG. 7B and FIG. 7C are perspective views schematically showing the assembly procedure of the exemplary embodiment of the present invention.

As shown in FIG. 5, the liquid crystal apparatus in this embodiment includes a liquid crystal panel 1, and a backlight unit 10 which irradiates backlight to the liquid crystal panel 1 as the main constituent members. The liquid crystal panel 1 is not restricted in shape, structure and driving method, and may be in any shape, structure and driving method. The present invention is characterized in that a dust preventing tape 8 is stuck to a region including at least the peripheral portion of the display surface of the liquid crystal panel 1 and the side surface of the backlight unit 10. Namely, the dust preventing tape 8 covers the region from the peripheral portion of the display surface of the liquid crystal panel 1 to at least the side surface of the backlight unit 10.

Further, the dust preventing tape 8 may be made to cover the region from the peripheral portion of the display surface of the liquid crystal panel 1 to the back surface member (e.g., a circuit board 7 and a back side shield plate 6 in FIG. 5) disposed on the back side of the backlight unit 10. In this case, dust prevention by the dust prevention tape 8 becomes more effective.

In the liquid crystal display apparatus according to this embodiment, the construction other than the dust preventing tape 8 may be the same as the conventional one. Namely, a frame-shaped front side shield plate 2 is provided to cover the peripheral portion of the display surface of the liquid crystal panel 1 and the side surface of the backlight unit 10. The backlight unit 10 includes a frame-shaped chassis 3 which holds a light guide plate (not shown) disposed inside the backlight unit 10, and the back side shield plate 6 which covers the side surface of the chassis 3 and the back side of the light guide plate.

The light guide plate is not illustrated in FIG. 5, and is disposed in a space shown by reference numeral 9. In the case of the edge light type backlight unit, the light source (not shown) is disposed at one end surface of the light guide plate, and light coming from the light source is guided to the back surface of the liquid crystal panel 1 by the light guide plate, and irradiated. In the case of the direct light type backlight unit, the light source is disposed directly under the light guide plate. The light source can be realized by a CCFL (Cold Cathode Fluorescent Lamp), an LED (Light Emitting Diode) and the like.

In the chassis 3, a spacer 5 is placed on the surface on which the liquid crystal panel 1 is mounted. A circuit board 7 for operating the liquid crystal panel 1 is mounted on the outer surface of the back side shield plate 6, or the side surface of the chassis 3. The circuit board 7 and the liquid crystal panel 1 are connected with a TCP 4 which is a connecting member constituted of a flexible tape. The TCP 4 is an LSI driver which operates the liquid crystal panel 1, and may be a COF. The circuit board 7 which is connected with the TCP 4 supplies a signal for driving a semiconductor element such as TFT integrated on the liquid crystal panel 1. In FIG. 5, illustration of an optical member and a reflecting member is omitted. The optical member is disposed on the front surface (at the side of the liquid crystal panel 1) of the light guide plate, and uniforms the light from the light guide plate to irradiate it to the liquid crystal panel 1. The reflecting member is disposed on the back surface (opposite side to the liquid crystal panel 1) of the light guide plate, and reflects the light from the back surface of the light guide plate to the light guide plate.

The dust preventing tape 8 which is the characteristic of the present invention is stuck to the peripheral portion of the display surface of the liquid crystal panel 1 to close a gap between the peripheral portion of the display surface of the liquid crystal panel 1 and the front surface member (i.e., the front side shield plate 2) disposed at the peripheral portion of the display surface of the liquid crystal panel 1, thereby providing the dust prevention effect. In this case, from the point of view of stress on the display surface of the liquid crystal panel 1, the dust preventing tape 8 is stuck to only the peripheral portion of the display surface, and therefore, a specific stress is not applied to the display surface of the liquid crystal panel 1 from outside. Therefore, partial change in the optical characteristics of the liquid crystal panel 1 due to application of such a stress does not occur, and uneven display is not caused.

As shown in FIG. 5 and FIG. 6, the dust preventing tape 8 can be stuck so as to cover the wider region including the peripheral portion of the display surface of the liquid crystal panel 1, the TCP 4 on the side surface of the backlight unit 10 and part of the circuit board 7 on the back surface of the backlight unit 10. In this case, since the circuit board 7 at the periphery on the back side of the backlight unit 10 and the TCP (or COF) 4 are covered with the dust preventing tape 8, a liquid crystal module excellent in electrical insulating effect and mechanical strength can be obtained.

The dust preventing tape 8 can be realized by forming a synthetic resin such as PET (polyethylene terephthalate) with a thickness to be easily bent, for example. The suitable thickness of the dust preventing tape 8 is about 0.05 mm to 0.1 mm.

The method for assembling the liquid crystal display apparatus in the exemplary embodiment of the present invention will be described in detail. The liquid crystal display apparatus is assembled in accordance with the procedure which is schematically shown in FIG. 7A to FIG. 7C. First, as shown in FIG. 7A, the backlight unit 10, the assembly of the liquid crystal panel 1 and the front side shield plate 2 are prepared. The TCP 4 for electrical connection and the circuit board 7 for driving the liquid crystal panel are connected to the liquid crystal panel 1, and this state is called the assembly of the liquid crystal panel 1 in this case. In the backlight unit 10, the light guide plate and the light source are fixed on the frame-shaped chassis 3 together with the back side shield plate 6. In the assembly of the liquid crystal panel 1, part of the dust preventing tape 8 is stuck to the peripheral portion of the display surface of the liquid crystal panel 1. In this state, only part of the dust preventing tape 8 (portion corresponding to the peripheral portion of the display surface of the liquid crystal panel 1) is stuck, and the remaining part of the tape 8 is not stuck yet. In FIG. 7A, the circuit board 7 and the dust preventing tape 8 are illustrated in the state in which they are folded back to the back surface of the liquid crystal panel 1, but they are not fixed yet, and are in the flexible and free state.

Next, as shown in FIG. 7B, the assembly of the liquid crystal panel 1 and the backlight unit 10 are laid on each other. After the backlight unit 10 is disposed from above the assembly of the liquid crystal panel 1, the circuit board 7 and the dust preventing tape 8 are completely folded back, and are fixed on the back surface of the backlight unit 10. The spacer 5 is disposed between the chassis 3 of the backlight unit 10 and the assembly of the liquid crystal panel 1. On this occasion, the dust preventing tape 8 is also stuck so as to cover the part of the circuit board 7 (or the back side shield plate 6) on the back surface of the backlight unit 10, and the backlight unit 10 and the assembly of the liquid crystal panel 1 are integrated.

Finally, as shown in FIG. 7C, the front side shield plate 2 is mounted from the front surface side of the liquid crystal panel 1 and the backlight unit, and thereby, the liquid crystal display apparatus is completed.

In FIG. 7A, the explanation that part of the dust preventing tape 8 is stuck to the peripheral portion of the display surface of the liquid crystal panel 1 in advance is made, but this may not always be the case. For example, after the backlight unit 10 is laid on the assembly of the liquid crystal panel 1, and the circuit board 7 is folded and fixed to the back surface of the backlight unit 10 by the TCP 4, the dust preventing tape 8 may be stuck to cover the region from the peripheral portion of the display surface of the liquid crystal panel 1 to the circuit board 7.

The structure shown in FIG. 5 is only illustration, and the materials, the shapes and the like of the chassis 3 and the shield plates 2 and 6 are not especially limited. However, at least the shield plates 2 and 6 are preferably constructed by a metal plate or the like with a predetermined thickness to have enough strength to fix the light guide plate.

The difference between the conventional liquid crystal display apparatus (FIG. 1) and the exemplary embodiment of the present invention (FIG. 5) lies in presence or absence of the dust preventing tape 8 for dust prevention measures which is stuck to a region including at least the peripheral portion of the display surface of the liquid crystal panel 1 and the side surface of the backlight unit 10 in order to cover the region. In this exemplary embodiment, there is the possibility of dust entering from a gap between the front side shield plate 2 and the liquid crystal panel 1 at the side of the display surface (the lower side of the FIG. 5) of the liquid crystal panel 1. However, the dust preventing tape 8 for dust prevention measures is stuck to the peripheral portion of the display surface of the liquid crystal panel 1, the side surface of the backlight unit 10 and the peripheral edge of the back surface in order to eliminate a gap, and therefore, entry of dust into the inside from the dust preventing tape 8 can be prevented.

Further, as shown in FIG. 5, electrical insulation protection, mechanical protection can be provided between the circuit board 7 and the TCP (or COF) 4, and the front side shield plate 2 (a sheet metal is generally used) by the dust preventing tape 8.

Especially when the circuit board 7 is disposed on the back surface of the back side shield plate 6, insulation protection of the circuit board 7 becomes possible by sticking the dust preventing tape 8 to the back surface of the backlight unit 10, and at the same time, dust entering from the back surface of the backlight unit 10 can be prevented from entering into the display surface.

According to the present invention, dust prevention can be achieved by sticking the dust preventing tape 8 to the liquid crystal panel 1. Therefore, a special stress is not applied to the liquid crystal panel 1, and uneven display does not occur in the liquid crystal panel. Further, dust which enters from a gap between the front side shield plate 2 and the liquid crystal panel 1 can be prevented from reaching the inside of the liquid crystal display apparatus and causing poor display quality. When the dust preventing tape 8 is stuck to the back surface of the backlight unit 10 in such a manner as to envelop it, further dust prevention effect can be expected.

In the present invention, dust prevention is ensured by the dust preventing tape 8, and it is not necessary to prevent slipping of dust by causing the chassis 3 and the liquid crystal panel 1 to adhere closely to each other by the spacer 5. Therefore, it is not necessary to use the spacer having stickiness as described in the conventional structure, and the spacer 5 which only keeps the space between them and absorbs a stress can be used. Thereby, the problem of uneven display caused by the stress, which occurs to the chassis 3 or the like, and is transmitted and applied to the liquid crystal panel 1, as caused in the conventional structure, does not occur.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

This application is based on Japanese Patent Application No. JP 2005-373195 filed on Dec. 26, 2005, and including a specification, claims, drawings and summary.

What is claimed is:

1. A liquid crystal display apparatus, comprising:
a liquid crystal panel;
a backlight unit that is disposed on a back side of the liquid crystal panel;
a back side shield plate disposed on a back surface of the backlight unit; and
a dust preventing tape that is covered from a region including a peripheral portion of a display surface of the liquid crystal panel to the back side shield plate or a liquid crystal panel driving circuit located at a back surface of the backlight unit,
wherein the dust preventing tape includes dust preventing tapes that are stuck to the peripheral portions of a front side of the display surface of the liquid crystal panel along all four edges of the liquid crystal panel, and the liquid crystal panel driving circuit is located at the back surface of the backlight unit,
wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and
wherein the dust preventing tape is located in between a front side shield plate and a tape carrier package.

2. The liquid crystal display apparatus according to claim 1, further comprising:
a front side shield plate disposed at the peripheral portion of the display surface of the liquid crystal panel.

3. The liquid crystal display apparatus according to claim 2, wherein the dust preventing tape covers a surface of a connecting member that connects the liquid crystal panel and the liquid crystal panel driving circuit board.

4. The liquid crystal display apparatus according to claim 2, wherein the dust preventing tape is located between the front side shield plate and the back side shield plate.

5. The liquid crystal display apparatus according to claim 1, wherein the dust preventing tape comprises a synthetic resin.

6. The liquid crystal display apparatus according to claim 5, wherein a thickness of the dust preventing tape is about 0.05 mm to 0.1 mm.

7. The liquid crystal display apparatus according to claim 5, wherein the synthetic resin from that the dust preventing tape is formed comprises polyethylene terephthalate.

8. A dust preventing method for a liquid crystal display apparatus comprising a liquid crystal panel, and a backlight unit that is disposed on a back side of the liquid crystal panel, said method comprising:
disposing a back side shield plate on a back surface of the backlight unit; and
disposing a dust preventing tape that is covered from a region including a peripheral portion of a display surface of the liquid crystal panel to the back side shield plate or a liquid crystal panel driving circuit located at a back surface of the backlight unit,
wherein the dust preventing tape includes dust preventing tapes that are stuck to the peripheral portions of a front side of the display surface of the liquid crystal panel along all four edges of the liquid crystal panel, and the liquid crystal panel driving circuit is located at the back surface of the backlight unit,
wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and wherein the dust preventing tape is located in between a front side shield plate and a spacer.

9. The dust preventing method for a liquid crystal display apparatus according to claim 8, wherein a front side shield plate is disposed at the peripheral portion of the display surface of the liquid crystal panel.

10. The dust preventing method for a liquid crystal display apparatus according to claim 9, wherein the dust preventing tape is stuck to cover a surface of a connecting member that connects the liquid crystal panel and the liquid crystal panel driving circuit board.

11. The dust preventing method for a liquid crystal display apparatus according to claim 9, wherein the dust preventing tape is stuck between the front side shield plate and the back side shield plate.

12. The dust preventing method for a liquid crystal display apparatus according to claim 8, wherein the dust preventing tape comprises a synthetic resin.

13. The dust preventing method for a liquid crystal display apparatus according to claim 12, wherein a thickness of the dust preventing tape is about 0.05 mm to 0.1 mm.

14. The dust preventing method for a liquid crystal display apparatus according to claim 12, wherein the synthetic resin from that the dust preventing tape is formed comprises polyethylene terephthalate.

15. A method of making a liquid crystal display apparatus, said method comprising:
providing a liquid crystal panel;
connecting a backlight unit on a back side of the liquid crystal panel;
connecting a circuit board on a back surface of the backlight unit;
disposing a back side shield plate on a back surface of the backlight unit; and
disposing a dust preventing tape that is covered from a region including a peripheral portion of a display surface of the liquid crystal panel to the back side shield plate or a liquid crystal panel driving circuit located at a back surface of the backlight unit,
wherein the dust preventing tape includes dust preventing tapes that are stuck to the peripheral portions of a front side of the display surface of the liquid crystal panel along all four edges of the liquid crystal panel, and the liquid crystal panel driving circuit is located at the back surface of the backlight unit,
wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and
wherein the dust preventing tape is located in between a front side shield plate and a tape carrier package.

16. The method of making a liquid crystal display apparatus of claim 15, further comprising mounting a front side shield on a front surface of the liquid crystal panel after said covering.

17. The method of making a liquid crystal display apparatus of claim 15, wherein the dust preventing tape is located in between a front side shield plate and the back side shield plate.

18. The liquid crystal display apparatus according to claim 1, wherein the dust preventing tape is further adapted to cover a tape carrier package and a spacer between the liquid crystal panel and the backlight unit.

19. A liquid crystal display apparatus, comprising:
a liquid crystal panel;
a backlight unit that is disposed on a back side of the liquid crystal panel;
a back side shield plate disposed on a back surface of the backlight unit; and
a dust preventing tape that is covered from a region including a peripheral portion of a display surface of the liquid crystal panel to the back side shield plate or a liquid crystal panel driving circuit located at a back surface of the backlight unit,
wherein the dust preventing tape includes dust preventing tapes that are stuck to peripheral portions of a front side of the display surface of the liquid crystal panel along all four edges of the liquid crystal panel, and a front side shield is located above the dust preventing tape,
wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and
wherein the dust preventing tape is located in between a front side shield plate and a tape carrier package.

20. A dust preventing method for a liquid crystal display apparatus comprising a liquid crystal panel, and a backlight unit that is disposed on a back side of the liquid crystal panel, said method comprising:
disposing a back side shield plate on a back surface of the backlight unit; and
disposing a dust preventing tape that is covered from a region including a peripheral portion of a display surface of the liquid crystal panel to the back side shield plate or a liquid crystal panel driving circuit located at a back surface of the backlight unit,
wherein the dust preventing tape includes dust preventing tapes that are stuck to peripheral portions of a front side of the display surface of the liquid crystal panel along all four edges of the liquid crystal panel, and a front side shield is located above the dust preventing tape,
wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and
wherein the dust preventing tape is located in between a front side shield plate and a tape carrier package.

21. A method of making a liquid crystal display apparatus, said method comprising:
providing a liquid crystal panel;
connecting a backlight unit on a back side of the liquid crystal panel;
connecting a circuit board on a back surface of the backlight unit;
disposing a back side shield plate on a back surface of the backlight unit; and
disposing a dust preventing tape that is covered from a region including a peripheral portion of a display surface of the liquid crystal panel to the back side shield plate or a liquid crystal panel driving circuit located at a back surface of the backlight unit, wherein the dust preventing tape includes dust preventing tapes that are stuck to peripheral portions of a front side of the display surface of the liquid crystal panel along all four edges of the liquid crystal panel, and a front side shield is located above the dust preventing tape, wherein the dust preventing tape extends from a front side of the liquid crystal panel opposite the back side of the liquid crystal panel, through a side surface of the backlight unit, and to a first surface of the liquid crystal panel driving circuit opposite a second surface of the liquid crystal panel that contacts the back surface of the backlight unit, and wherein the dust preventing tape is located in between a front side shield plate and a tape carrier package.

* * * * *